US012812697B2

(12) United States Patent
Wang et al.

(10) Patent No.: US 12,812,697 B2
(45) Date of Patent: Nov. 24, 2026

(54) DATA TRANSMISSION METHOD AND DEVICE, NETWORK APPARATUS AND TERMINAL

(71) Applicant: GUANGDONG OPPO MOBILE TELECOMMUNICATIONS CORP., LTD., Guangdong (CN)

(72) Inventors: Shukun Wang, Guangdong (CN); Cong Shi, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 488 days.

(21) Appl. No.: 17/521,824

(22) Filed: Nov. 8, 2021

(65) Prior Publication Data

US 2022/0070945 A1 Mar. 3, 2022

Related U.S. Application Data

(63) Continuation of application No. PCT/CN2019/094714, filed on Jul. 4, 2019.

(51) Int. Cl.
*H04W 74/00* (2009.01)
*H04W 74/0833* (2024.01)
(Continued)

(52) U.S. Cl.
CPC ..... *H04W 74/0841* (2013.01); *H04W 74/002* (2013.01); *H04W 74/0833* (2013.01);
(Continued)

(58) Field of Classification Search
CPC .......... H04W 52/0229; H04W 52/0235; H04B 11/00; G06F 3/167; G06F 9/4418;
(Continued)

(56) References Cited

U.S. PATENT DOCUMENTS

2010/0150082 A1* 6/2010 Shin ...................... H04W 72/21 370/329
2014/0241297 A1* 8/2014 Park .................. H04W 74/0833 370/329

(Continued)

FOREIGN PATENT DOCUMENTS

CN 107241764 10/2017
CN 109803455 5/2019

(Continued)

OTHER PUBLICATIONS

"Office Action of China Counterpart Application, Application No. 202211521559.X", with English translation thereof, issued on May 16, 2024, p. 1-p. 17.

(Continued)

*Primary Examiner* — Jay P Patel
*Assistant Examiner* — Shehab A Alawdi
(74) *Attorney, Agent, or Firm* — Hodgson Russ LLP

(57) ABSTRACT

A data transmission method and device, a network apparatus, and a terminal are provided. The method includes: receiving first indication information sent by a terminal by a target base station, where the first indication information is configured to indicate a number of packet data to be sent by the terminal and/or whether the packet data to be sent exists; and sending first configuration information to the terminal by the target base station, where the first configuration information is used by the terminal to determine at least one uplink transmission resource corresponding to at least one of the packet data to be sent.

15 Claims, 9 Drawing Sheets

(51) Int. Cl.
*H04W 76/19* (2018.01)
*H04W 80/02* (2009.01)
*H04W 74/0836* (2024.01)

(52) U.S. Cl.
CPC .......... *H04W 76/19* (2018.02); *H04W 80/02* (2013.01); *H04W 74/0836* (2024.01)

(58) Field of Classification Search
CPC ......... Y02D 30/70; G10L 15/22; G10L 15/02; G10L 2015/223
See application file for complete search history.

(56) References Cited

U.S. PATENT DOCUMENTS

| | | | | |
|---|---|---|---|---|
| 2015/0019887 | A1* | 1/2015 | Yu | H04L 49/351 713/310 |
| 2016/0285775 | A1* | 9/2016 | Damnjanovic | H04L 47/30 |
| 2016/0337089 | A1* | 11/2016 | Chen | H04L 1/1861 |
| 2017/0196022 | A1 | 7/2017 | Yi et al. | |
| 2018/0199251 | A1* | 7/2018 | Kim | H04W 36/0066 |
| 2018/0220486 | A1 | 8/2018 | Tseng et al. | |
| 2018/0317114 | A1* | 11/2018 | Kim | H04W 24/10 |
| 2019/0045554 | A1 | 2/2019 | Ye et al. | |
| 2019/0141776 | A1 | 5/2019 | Kim et al. | |
| 2019/0320476 | A1* | 10/2019 | Wang | H04W 76/15 |
| 2019/0349837 | A1* | 11/2019 | Shih | H04W 48/08 |
| 2020/0229241 | A1* | 7/2020 | Jeon | H04W 74/0833 |
| 2020/0314893 | A1* | 10/2020 | Chou | H04W 74/006 |
| 2020/0351033 | A1* | 11/2020 | Ryu | H04L 1/1861 |
| 2020/0374972 | A1* | 11/2020 | Geng | H04W 12/0431 |
| 2021/0360523 | A1* | 11/2021 | Hwang | H04L 5/0091 |
| 2022/0007376 | A1* | 1/2022 | Xu | H04W 24/00 |

FOREIGN PATENT DOCUMENTS

| | | |
|---|---|---|
| CN | 109863783 | 6/2019 |
| EP | 3651503 | 5/2020 |
| WO | 2018064367 | 4/2018 |
| WO | 2019031427 | 2/2019 |
| WO | 2019062926 | 4/2019 |

OTHER PUBLICATIONS

LG Electronics Inc, “Contents in MAC layer of msgA and msgB”, 3GPP TSG-RAN WG2 Meeting #105bis R2-1903731, Apr. 8-12, 2019, pp. 1-4.
“Search Report of Europe Counterpart Application”, issued on Mar. 30, 2022, p. 1-p. 13.
Mediatek Inc., “On NB-IoT EDT indication via PRACH.” 3GPP TSG RAN WG2 Meeting #100, Nov. 27-Dec. 1, 2017, R2-1713679, pp. 1-5.
Mediatek Inc., “Early Data Transmission TBS Determination.” 3GPP TSG RAN WG1 Meeting #92, Feb. 26-Mar. 2, 2018, R1-1801686, pp. 1-6.
“International Search Report (Form PCT/ISA/210) of PCT/CN2019/094714,” mailed on Jan. 2, 2021, with English translation thereof, pp. 1-6.
“Written Opinion of the International Searching Authority (Form PCT/ISA/237) of PCT/CN2019/094714,” mailed on Jan. 2, 2021, with English translation thereof, pp. 1-6.

* cited by examiner

DATA TRANSMISSION METHOD AND DEVICE, NETWORK APPARATUS AND TERMINAL

CROSS-REFERENCE TO RELATED APPLICATION

This application is a continuation of international PCT application serial no. PCT/CN2019/094714, filed on Jul. 4, 2019. The entirety of the above-mentioned patent application is hereby incorporated by reference herein and made a part of this specification.

BACKGROUND

Technical Field

The embodiments of the disclosure relate to the field of mobile communication technology, and in particular, to a data transmission method and device, a network apparatus, and a terminal.

Description of Related Art

In Long Term Evolution (LTE), early data transmission (EDT) is introduced, and EDT data transmission is also referred to as small data transmission, small data packet transmission, or packet data transmission. For uplink packet data transmission, currently, only one packet data transmission is supported, but there may be continuous multiple packet data transmissions in some scenarios. How to achieve continuous transmission of multiple packet data is an important issue.

SUMMARY

The embodiments of the disclosure provide a data transmission method and device, a network apparatus, and a terminal.

An embodiment of the disclosure provides a data transmission method, and the method includes the following steps.

A target base station receives first indication information sent by a terminal. The first indication information is configured to indicate a number of packet data to be sent by the terminal and/or whether the packet data to be sent exists.

The target base station sends first configuration information to the terminal. The first configuration information is used by the terminal to determine at least one uplink transmission resource corresponding to at least one of the packet data to be sent.

An embodiment of the disclosure further provides a data transmission method, and the method includes the following steps.

A terminal sends first indication information to a target base station. The first indication information is configured to indicate a number of packet data to be sent by the terminal and/or whether the packet data to be sent exists.

The terminal receives first configuration information sent by the target base station. The first configuration information is used by the terminal to determine at least one uplink transmission resource corresponding to at least one of the packet data to be sent.

An embodiment of the disclosure further provides a data transmission device including a receiving unit and a sending unit.

The receiving unit is configured to receive first indication information sent by a terminal. The first indication information is configured to indicate a number of packet data to be sent by the terminal and/or whether the packet data to be sent exists.

The sending unit is configured to send first configuration information to the terminal.

The first configuration information is used by the terminal to determine at least one uplink transmission resource corresponding to at least one of the packet data to be sent.

An embodiment of the disclosure further provides a data transmission device including a sending unit and a receiving unit.

The sending unit is configured to send first indication information to a target base station. The first indication information is configured to indicate a number of packet data to be sent by the terminal and/or whether the packet data to be sent exists.

The receiving unit is configured to receive first configuration information sent by the target base station. The first configuration information is used by the terminal to determine at least one uplink transmission resource corresponding to at least one packet data to be sent.

An embodiment of the disclosure further provides a network apparatus including a processor and a memory. The memory is configured to store a computer program, and the processor is configured to call and run the computer program stored in the memory and executes the foregoing data transmission method.

An embodiment of the disclosure further provides a terminal including a processor and a memory. The memory is configured to store a computer program, and the processor is configured to call and run the computer program stored in the memory and executes the foregoing data transmission method.

An embodiment of the disclosure further provides a chip configured for implementing the foregoing data transmission method.

To be specific, the chip includes a processor configured to call and run a computer program from a memory, such that an apparatus installed with the chip executes the foregoing data transmission method.

An embodiment of the disclosure further provides a computer-readable storage medium configured for storing a computer program, and the computer program enables a computer to execute the foregoing data transmission method.

An embodiment of the disclosure further provides a computer program product including a computer program instruction, and the computer program instruction enables a computer to execute the foregoing data transmission method.

An embodiment of the disclosure further provides a computer program, and when running on a computer, the computer program enables the computer to execute the foregoing data transmission method.

Through the above technical solution, when the terminal is provided with multiple continuous packet data to be sent, the terminal sends the first indication information to the target base station. The first indication information indicates the number of the packet data to be sent by the terminal and/or whether the packet data to be sent exists. In this way, the target base station configures the terminal with at least one uplink transmission resource corresponding to at least one of the packet data to be sent according to the first indication information, and packet data may therefore be efficiently transmitted.

BRIEF DESCRIPTION OF THE DRAWINGS

The drawings described herein are used to provide a further understanding of the disclosure, and constitute a part of the disclosure. The exemplary embodiments of the disclosure and the description thereof are used to explain the disclosure, and do not constitute an improper limitation of the disclosure. In the drawings.

DESCRIPTION OF THE EMBODIMENTS

The technical solution in the embodiments of the disclosure will be described below together with the drawings in the embodiments of the disclosure. Nevertheless, the described embodiments are part of the embodiments of the disclosure, not all the embodiments. Based on the embodiments of the disclosure, all other embodiments obtained by a person having ordinary skill in the art without making any inventive effort fall within the scope that the disclosure seeks to protect.

The technical solution provided by the embodiments of the disclosure may be applied to various communication systems, such as a global system of mobile communication (GSM) system, a code division multiple access (CDMA) system, a wideband code division multiple access (WCDMA) system, a general packet radio service (GPRS) system, a long term evolution (LTE) system, a LTE frequency division duplex (FDD) system, a LTE time division duplex (TDD) system, a universal mobile telecommunication system (UMTS), a worldwide interoperability for microwave access (WiMAX) communication system, or a 5G system and the like.

Figure 1:
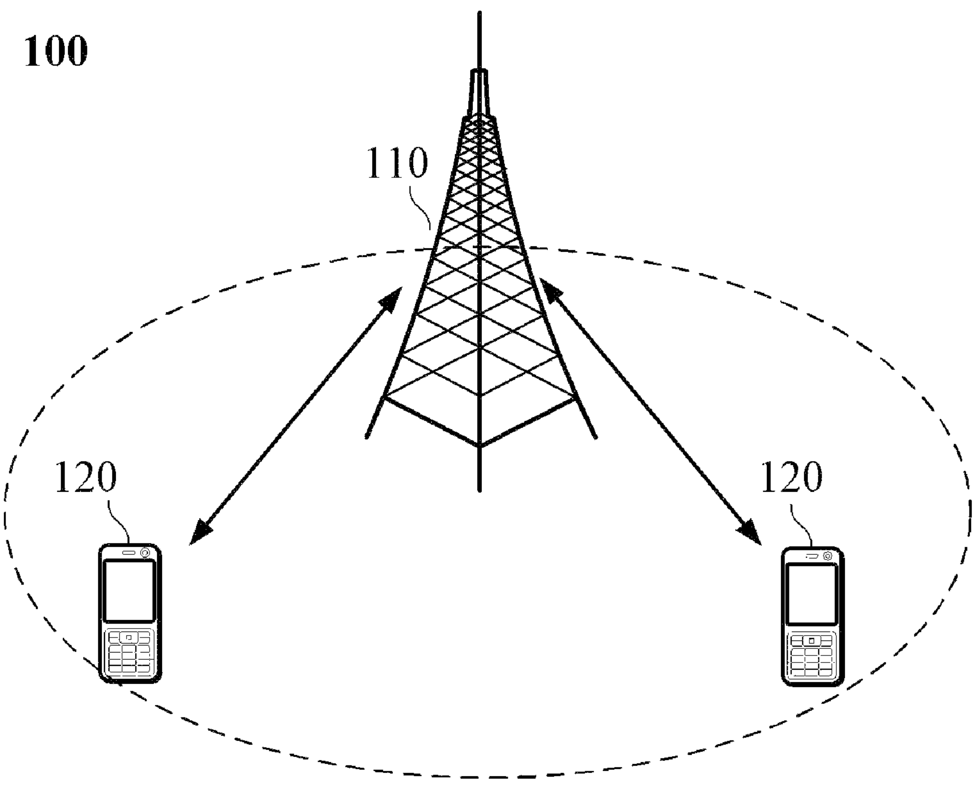
FIG. 1 is a schematic view of a communication system architecture provided an embodiment of the disclosure.

Exemplarily, a communication system 100 applied in the embodiments of the disclosure is shown in FIG. 1. The communication system 100 may include a network apparatus 110, and the network apparatus 110 may be an apparatus communicating with a terminal 120 (or referred to as a communication terminal or a terminal). The network apparatus 110 may provide communication coverage for a specific geographic area and may communicate with a terminal located within the coverage area. Optionally, the network apparatus 110 may be a base station (base transceiver station, BTS) in the GSM system or the CDMA system, may also be a base station (NodeB or NB) in the WCDMA system, and may further be an evolutional base station (evolutional node B, eNB or eNodeB) in the LTE system, or a wireless controller in a cloud radio access network (CRAN). Alternatively, the network apparatus may be a network apparatus in a mobile switching center, a repeater station, an access point, a vehicle-mounted device, a wearable device, a hub, a switch, a bridge, a router, a network side device in a 5G network, or a public land mobile network (PLMN) that evolves in the future, and so on.

The communication system 100 also includes at least one terminal 120 located within the coverage area of the network apparatus 110. The "terminal" used herein includes, but not limited to, connection via a wired line (e.g., a public switched telephone network (PSTN), a digital subscriber line (DSL), a digital cable, or a direct cable), via another data connection/network, via a wireless interface (e.g., for a cellular network, a wireless local area network (WLAN), a digital television network such as a DVB-H network, a satellite network, or an AM-FM broadcast transmitter), via another terminal that is configured to receive/send a communication signal, and/or via an Internet of Things (IoT) apparatus. A terminal that is configured to communicate through a wireless interface may be referred to as a "wireless communication terminal", a "wireless terminal", or a "mobile terminal". Examples of the mobile terminal include, but not limited to, a satellite or cellular phone; a personal communication system (PCS) terminal that may combine a cellular radio phone with data processing, facsimileing, and data communication capabilities, may include a radio phone, a pager, Internet/Intranet access, a web browser, a notepad, a calendar, and/or a personal digital assistant (PDA) of a global positioning system (GPS) receiver, may include a conventional laptop and/or a handheld receiver, or may include other electronic devices including a radio telephone transceiver. The terminal may refer to an access terminal, user equipment (UE), a user unit, a user station, a mobile station, a mobile platform, a remote station, a remote terminal, a mobile device, a user terminal, a terminal, a wireless communication device, a user agent, or a user device. The access terminal may be a cellular phone, a cordless phone, a session initiation protocol (SIP) phone, a wireless local loop (WLL) station, a PDA, a handheld device with wireless communication capabilities, a computing device or other processing devices connected to a wireless modem, a vehicle-mounted device, a wearable device, a terminal in a 5G network, or a terminal in a PLMN that may evolve in the future.

Optionally, device to device (D2D) communication may be performed between terminals 120.

Optionally, the 5G system or 5G network may also be referred to as a new radio (NR) system or NR network.

One network apparatus and two terminals are exemplarily depicted in FIG. 1.

Optionally, the communication system 100 may include a plurality of network apparatuses, and the coverage area of each of the network apparatuses may include terminals of other numbers, which is not limited in the embodiments of the disclosure.

Optionally, the communication system 100 may also include other network entities such as a network controller, a mobility management entity, etc., which is not limited in the embodiments of the disclosure.

It should be understood that an apparatus with a communication function in the network/system in the embodiments of the disclosure may be referred to as a communication apparatus. Taking the communication system 100 shown in FIG. 1 as an example, the communication apparatus may include the network device 110 and the terminals 120 having the communication function. The network apparatus 110 and the terminals 120 may be the specific apparatuses described above, and description thereof is thus not repeated herein. The communication apparatus may further include other apparatuses in the communication system 100, such as other network entities including a network controller, a mobility management entity, etc., which is not limited in the embodiments of the disclosure.

It should be understood that the terms "system" and "network" in the specification are often used interchangeably in the specification. The term "and/or" in the specification is only an association relationship describing the associated objects, and it means that there may be three types of relationships. For instance, A and/or B may mean that: A exists alone, A and B exist at the same time, and B exists alone. Further, the character "/" in the specification generally indicates that the associated objects before and after are in an "or" relationship.

In order to facilitate the understanding of the technical solution of the embodiments of the disclosure, the technical solution related to the embodiments of the disclosure is described below.

Three Radio Resource Control (RRC) States

In the 5G network environment, in order to reduce air interface signaling, quickly resume wireless connection, and quickly resume data services, a new RRC state, that is, the RRC inactive (RRC_INACTIVE) state, is defined. This state is different from the RRC idle (RRC_IDLE) state and the RRC connected (RRC_CONNECTED) state.

The three RRC states in the 5G network environment are described as follows.

1) RRC_IDLE state (hereinafter referred to as idle state): Mobility is UE-based cell selection and reselection, paging is initiated by the core network (CN), and the paging area is configured by the CN. UE access stratum (AS) context is not provided on the base station side. An RRC connection is not provided.

2) RRC_CONNECTED state (hereinafter referred to as connected state): An RRC connection is provided, and UE AS context is provided between the base station and the UE. The network side knows that the location of the UE is of a specific cell level. Mobility is the mobility controlled by the network side. Unicast data may be transmitted between the UE and the base station.

3) RRC_INACTIVE state (hereinafter referred to as inactive state): Mobility is UE-based cell selection and reselection, a connection between CN and RAN is provided, the UE AS context is stored on a specific base station, paging is triggered by the RAN, the RAN-based paging area is managed by the RAN, and the network side knows that the location of the UE is based on the paging area level of the RAN.

When the UE is in the inactive state, the following conditions trigger the UE to return to the idle state: 1) When the CN initial paging message is received; 2) When the RRC resume request is initiated, the timer T319 is started, if the timer expires; 3) MSG4 integrity protection verification fails; 4) When the cell is reselected to another radio access technology (RAT); 5) It enters the state of camping on any cell.

Radio Access Network (RAN) Notification Area (RNA)

When the UE is in the inactive state, the network side may configure the inactive state configuration parameters for the UE through RRC dedicated signaling (e.g., RRC release message), and the main configuration parameters include: 1) Inactive radio network temporary identification (I-RNTI), the I-RNTI is used to identify the UE inactive state context of the UE on the base station side, and the I-RNTI is unique within the base station. 2) RNA, RNA is used to control the area where the UE performs cell selection and reselection in the inactive state, and it is also the paging range area for the initial paging of the RAN. 3) RAN discontinuous reception cycle (RAN DRX cycle), the RAN DRX cycle is used to calculate the paging occasion of the RAN initial paging. 4) RAN notification area update period (RNA update periodicity, RNAU periodicity), RNAU periodicity is configured to control the period of the UE to perform periodic RAN location update. 5) Next hop chaining counter (NCC), NCC is used for the secret key used in the process of RRC connection resuming.

When the UE moves in the RNA area, it does not need to notify the network side and follows the mobility behavior in the idle state, that is, the principle of cell selection and reselection. When the UE moves out of the paging area configured by the RAN, the UE may be triggered to resume the RRC connection and reacquire the paging area configured by the RAN. When the UE has downlink data arriving, the base station that maintains the connection between the RAN and the CN for the UE may trigger all cells in the RAN paging area to send paging messages to the UE, so that the inactive UE may resume the RRC connection and receive data. On the other hand, the UE in the inactive state is configured with a RAN paging area, and in order to ensure the reachability of the UE in this area, the UE needs to perform periodic location updates according to the network configured period (based on the RNAU timer). Therefore, the scenarios that trigger the UE to execute RNAU include the timeout of the RNAU timer or the UE moving to an area outside the RNA.

When the target base station where the UE initiates the RRC connection resume process is not an anchor base station, the anchor base station determines whether to transfer the context of the UE to the target base station side. Therefore, in general, the target base station may carry the cause value carried in the UE initiated RRC connection resume request message in the retrieve UE context message and sends it to the anchor base station, and the anchor base station determines whether to transfer the context of the UE to the target base station side. The following describes the context transfer of the UE in combination with the RNAU process.

Figure 2A:
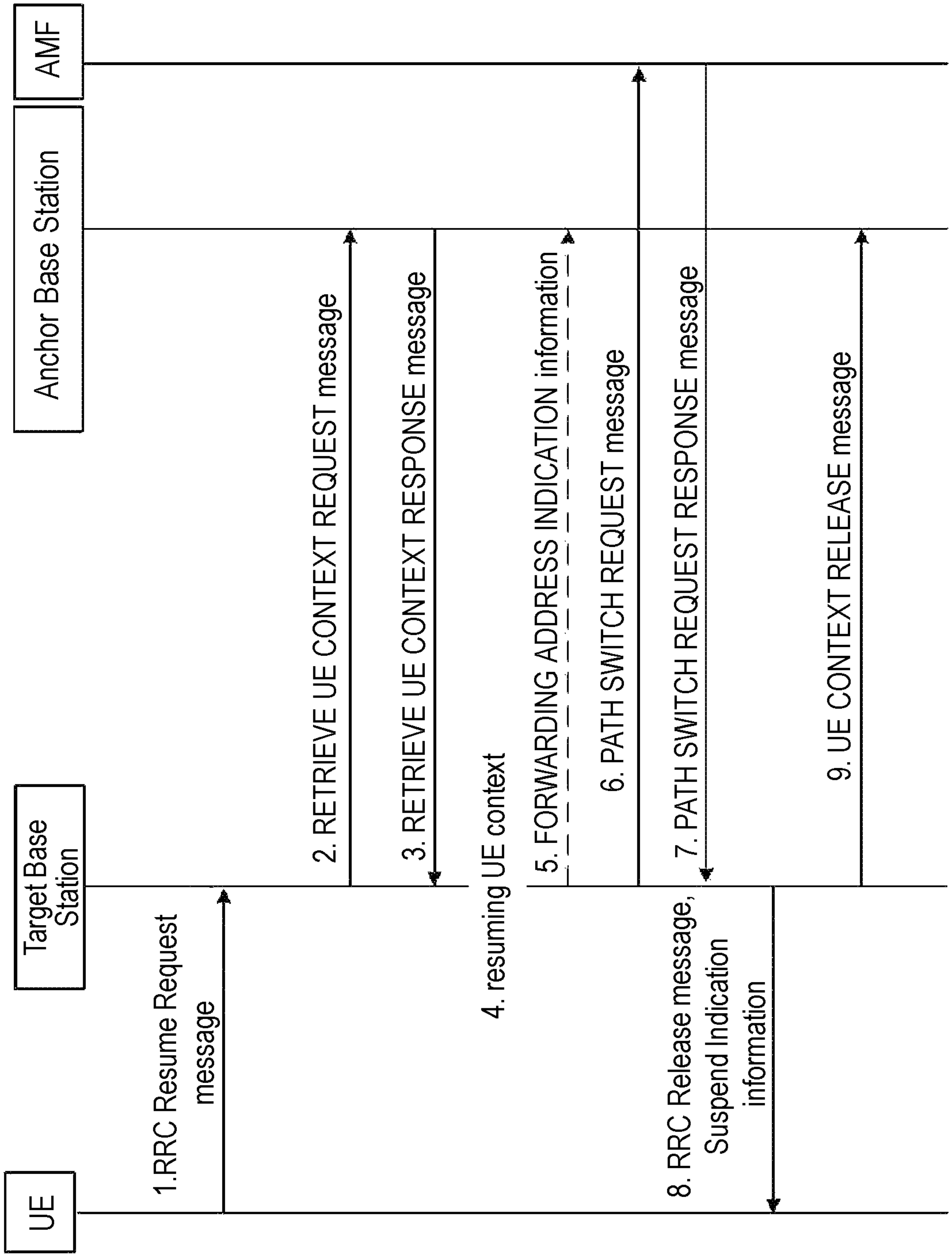
FIG. 2A is a flow chart of an RNAU with context transfer provided by an embodiment of the disclosure.

FIG. 2A is a flow chart of RNAU with context transfer, and the following steps are included.

1. The UE sends an RRC Resume Request message to the target base station.

Herein, the RRC Resume Request message carries the cause value for RRC resuming, that is, RNAU.

2. The target base station sends a RETRIEVE UE CONTEXT REQUEST message to the anchor base station.

Herein, the RETRIEVE UE CONTEXT REQUEST message carries information: RNAU.

3. The anchor base station sends a RETRIEVE UE CONTEXT RESPONSE message to the target base station.

4. The target base station resumes the UE context.

5. The target base station sends DATA FORWARDING ADDRESS INDICATION information to the anchor base station.

6. The target base station sends a PATH SWITCH REQUEST message to the access and mobility management function (AMF) entity.

7. The AMF sends a PATH SWITCH REQUEST RESPONSE message to the target base station.

8. The target base station sends an RRC Release message to the UE, and the RRC Release message carries Suspend Indication information.

9. The target base station sends a UE CONTEXT RELEASE message to the anchor base station.

Figure 2B:
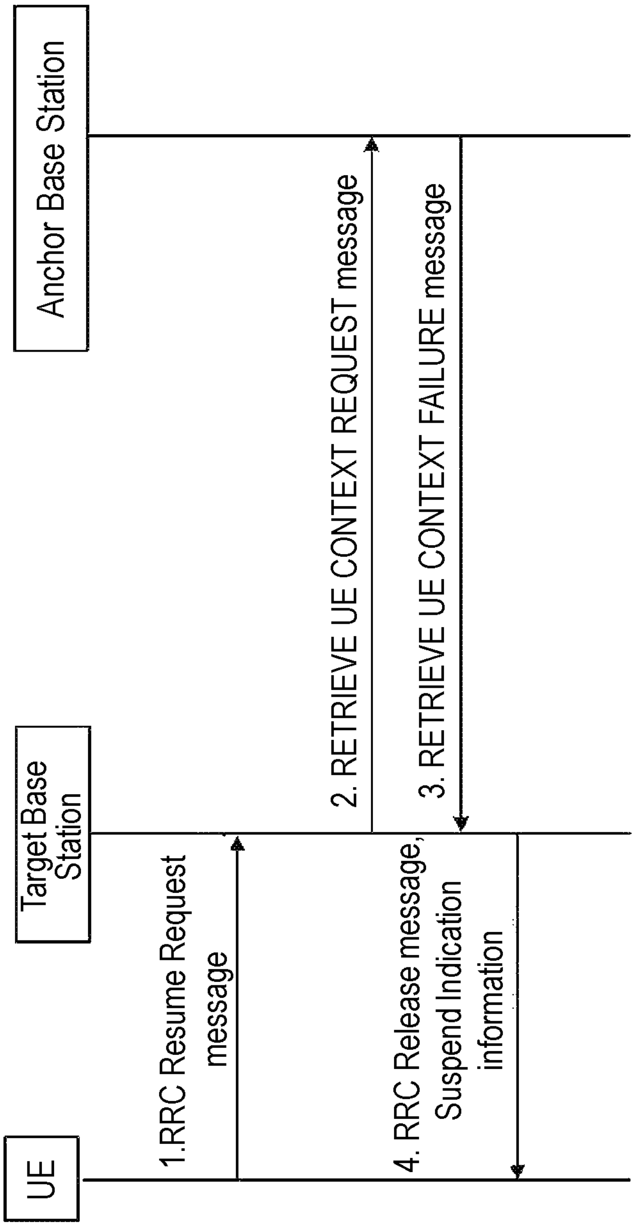
FIG. 2B is a flow chart of an RNAU without context transfer provided by an embodiment of the disclosure.

FIG. 2B is a flow chart of RNAU without context transfer, and the following steps are included.

1. The UE sends an RRC Resume Request message to the target base station.

Herein, the RRC Resume Request message carries the cause value for RRC resuming, that is, RNAU.

2. The target base station sends a RETRIEVE UE CONTEXT REQUEST message to the anchor base station.

Herein, the RETRIEVE UE CONTEXT REQUEST message carries information: RNAU.

3. The anchor base station sends a RETRIEVE UE CONTEXT FAILURE message to the target base station.

4. The target base station sends an RRC Release message to the UE, and the RRC Release message carries Suspend Indication information.

Note that the anchor base station in FIG. 2A and FIG. 2B refers to the base station that stores the UE context. In an example, the anchor base station is the base station that serves the UE last time.

EDT Data Transmission

EDT data transmission is introduced in LTE, and during the EDT data transmission process, the UE may always remain in an idle state or a suspend state or an inactive state to complete uplink and/or downlink EDT data transmission.

Figure 3:
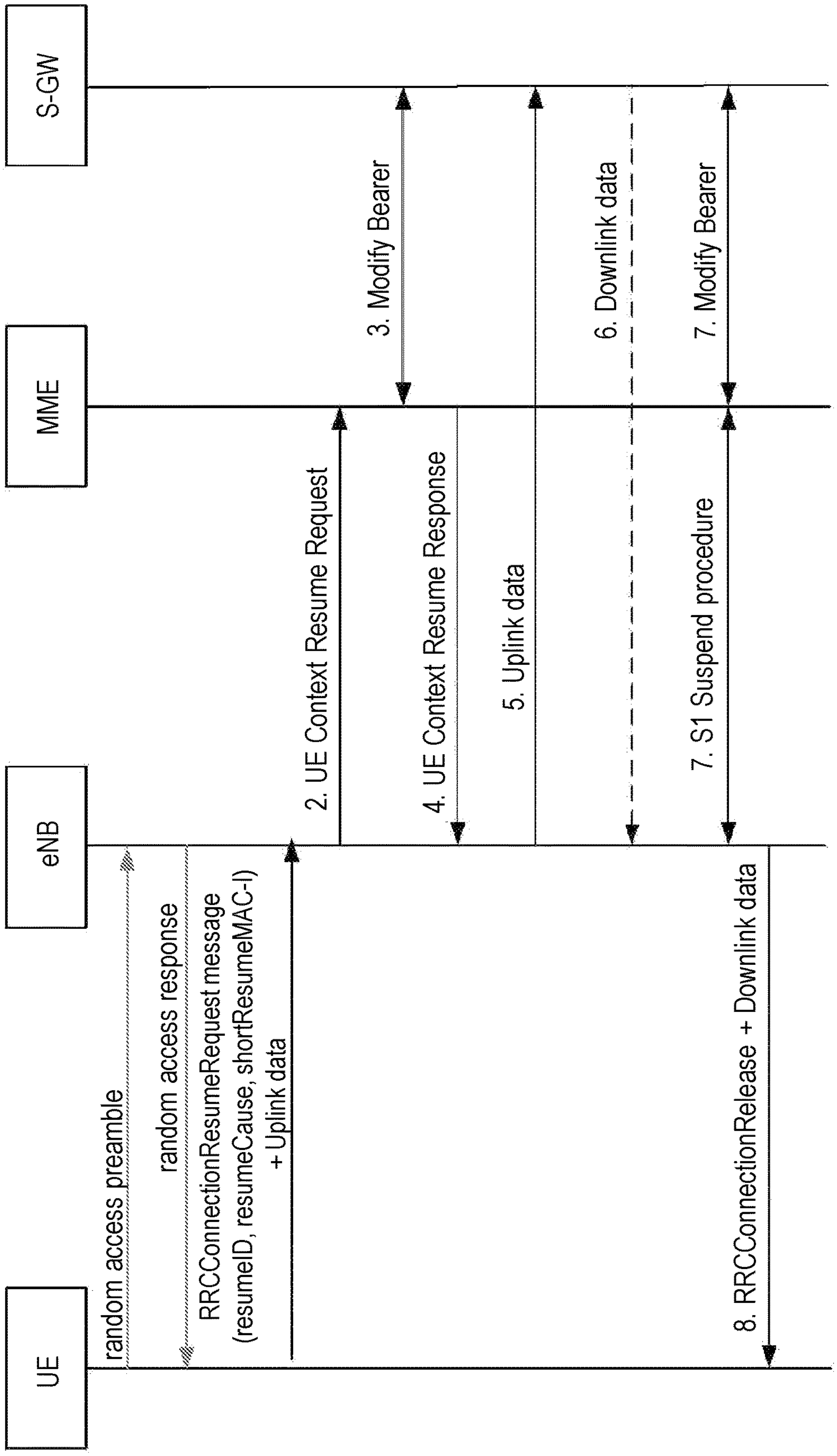
FIG. 3 is a flow chart of transmitting EDT data on a user plane provided by an embodiment of the disclosure.

The user plane transmission scheme may be adopted by EDT data transmission, and as shown in FIG. 3, the following steps are included.

1. The UE sends an RRCConnectionResumeRequest message and Uplink data to the eNB.

Herein, the RRCConnectionResumeRequest carries the following information: resumeID, resumeCause, and shortResumeMAC-I.

2. The eNB sends a UE Context Resume Request message to the MME.

3. Bearer modifying is performed between the MME and S-GW.

4. The MME sends a UE Context Resume Response message to the eNB.

5. The eNB sends Uplink data to the S-GW.

6. The S-GW sends Downlink data to the eNB.

7. Bearer modifying is performed between the MME and S-GW, and the S1 Suspend procedure is executed between the NB and MME.

8. The eNB sends an RRCConnectionRelease message and the Downlink data to the UE.

Herein, the RRCConnectionRelease message carries the following information: releaseCause, releaseID, and NCC.

Note that in FIG. 3, LTE is taken as an example for illustration. NR is the same as LTE, and the difference therebetween is that for NR, eNB needs to be replaced with gNB, the mobility management entity (MME) needs to be replaced with AMF, and the serving gateway (S-GW) needs to be replaced with the user plane function (UPF) entity.

In FIG. 3, the RRC connection resume request message is carried in the MSG3 of the random access process, and the uplink data belongs to user plane data. Herein, the uplink data is transmitted in a dedicated transmission channel (DTCH), the RRC connection resume request message is transmitted in a common control channel (CCCH), and a medium access control (MAC) service data unit (SDU) (i.e., DTCH SDU) corresponding to the uplink data and a MAC SDU (i.e., CCCH SDU) corresponding to the RRC connection resume request message are multiplexed in a same MAC protocol data unit (PDU) at a MAC layer. The downlink is the same as the uplink, the downlink data is transmitted in the DTCH, the RRC connection release message is transmitted in the CCCH, the MAC SDU (i.e., DTCH SDU) corresponding to the downlink data and the MAC SDU (i.e., CCCH SDU) corresponding to the RRC connection release message are multiplexed in the same MAC PDU at the MAC layer. What is needed is that the uplink data or the downlink data in FIG. 3 may be packet data. Herein, the packet data is also referred to as small data, small data packet, or EDT data.

For the transmission of the uplink packet data, only one packet data transmission is currently supported. However, in some scenarios, there may be several consecutive packet data transmissions. At this time, the terminal may only enter the connected state, and then after data is transmitted through the dedicated bearer, the terminal enters the idle state or the inactive state again, which increases signaling overhead and UE power consumption. To this end, the following technical solution is provided by the embodiments of the disclosure. The technical solution provided by the embodiments of the disclosure provides a new transmission method of packet data through which continuous transmission of a plurality of packet data is supported, the scenario of packet data transmission is expanded, EDT is widely applied, and signaling overhead and UE power consumption are further reduced.

Figure 4:
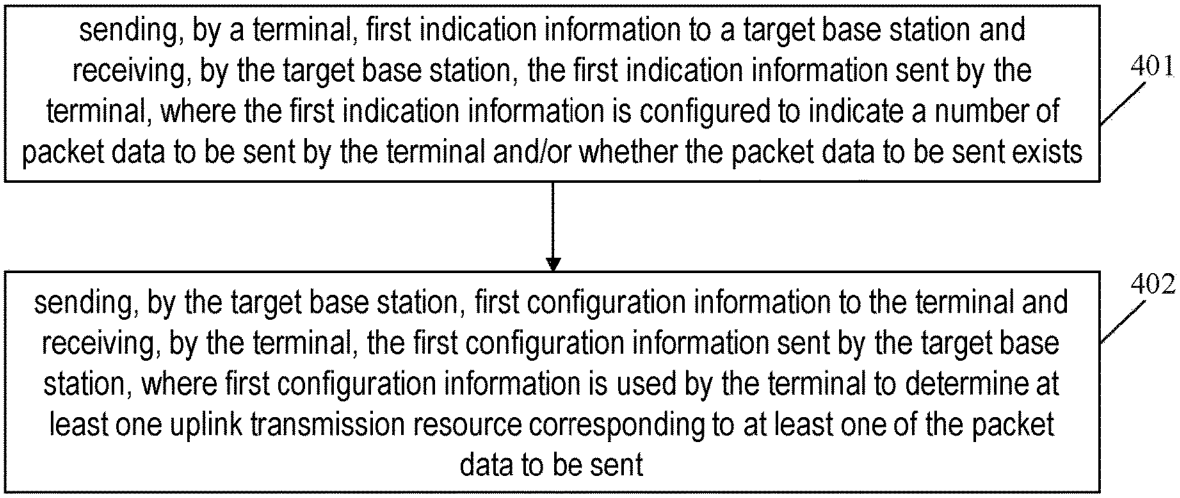
FIG. 4 is a schematic flow chart of a data transmission method provided by an embodiment of the disclosure.

FIG. 4 is a schematic flow chart of a data transmission method provided by the embodiments of the disclosure. As shown in FIG. 4, the data transmission method includes the following steps.

In step 401, a terminal sends first indication information to a target base station, and the target base station receives the first indication information sent by the terminal. The first indication information is configured to indicate a number of packet data to be sent by the terminal and/or whether the packet data to be sent exists.

In the embodiments of the disclosure, the terminal may be any apparatus capable of communicating with the network, such as a mobile phone, a tablet computer, a notebook, a vehicle-mounted terminal, and a wearable apparatus. In an optional embodiment, the terminal is a terminal in an inactive state.

In the embodiments of the disclosure, when the terminal is in an inactive state, N (N is a positive integer) pieces of packet data are required to be sent, and the terminal initiates a random access process. Specifically, the terminal sends an RRC resume request message to the target base station. During the random access process or after the random access process, the terminal sends the first indication information to the target base station. Through the first indication information, the target base station receives the indication of the number of the packet data to be sent by the terminal (that is, how many pieces of the packet data that the terminal has to send), and/or whether the packet data to be sent exists (that is, whether there is any subsequently packet data to be sent).

It should be noted that the random access process initiated by the terminal may be a contention-based 2-step random access process (hereinafter referred to as the 2-step random access process), or a contention-based 4-step random access process (hereinafter referred to as the 4 step random access process).

Herein, the 4-step random access includes the following steps: (1) The UE sends MSG1 to the base station. (2) The base station sends MSG2 to the UE. (3) The UE sends MSG3 to the base station. (4) The base station sends MSG4 to the UE. By combining the MSG1 and MSG3 in the 4-step random access process, the MSGA in the 2-step random access process may be obtained, and by combining the MSG2 and MSG4 in the 4-step random access process, the MSGB in the 2-step random access process may be obtained. It thus can be seen that the 2-step random access includes the following steps: (1) The UE sends MSGA to the base station. (2) The base station sends MSGB to the UE.

In the embodiments of the disclosure, implementation of the first indication information may be achieved by adopting any one of the following methods or a combination of any multiple methods.

Method one: The terminal sends a first preamble to the target base station on a first physical random access channel (PRACH) resource. The target base station receives the first preamble sent by the terminal on the first PRACH resource. The first PRACH resource and/or the first preamble have/has an association relationship with the number of the packet data to be sent by the terminal. The target base station determines the number of the packet data to be sent by the terminal according to the first PRACH resource and/or the first preamble.

Here, the association relationship is configured through second configuration information. To be specific, the target base station sends the second configuration information to the terminal, and the terminal receives the second configuration information sent by the target base station. The second configuration information is used by the terminal to determine the association relationship between the number of the packet data to be sent and the first PRACH resource and/or the first preamble. Based on the above, the terminal determines (or selects) the first PRACH resource and/or the first preamble based on the second configuration information and the number of the packet data to be sent.

In an optional embodiment, the second configuration information is configured through a system broadcasting message or dedicated signaling.

Method two: The terminal sends a first message to the target base station, and the target base station receives the first message sent by the terminal. The first message carries the first indication information. The first message is the MSG3 in the 4-step random access process, or the first message is the MSGA in the 2-step random access process.

Herein, if it is a 2-step random access process, the first indication information is carried in a payload in the MSGA.

Method three: The terminal sends uplink data or uplink signaling to the target base station, and the target base station receives the uplink data or the uplink signaling sent by the terminal. The MAC SDU corresponding to the uplink data or the uplink signaling is multiplexed with a first MAC control element (CE) in the same MAC PDU, and the first MAC CE carries the first indication information.

Herein, the first MAC CE is a newly defined uplink MAC CE, and the uplink MAC CE carries the first indication information.

Method four: The terminal sends uplink data or uplink signaling to the target base station, and the target base station receives the uplink data or the uplink signaling sent by the terminal. The MAC SDU corresponding to the uplink data or the uplink signaling is multiplexed with a second MAC CE in the same MAC PDU, and the second MAC CE carries a buffer status report (BSR). The BSR indicates that the packet data to be sent exists and/or the number of the packet data to be sent.

Herein, the second MAC CE is an existing MAC CE called a BSR MAC CE, and the BSR in the BSR MAC CE indicates that the packet data to be sent exitst and/or the number of the packet data to be sent.

Method five: The terminal sends a first data packet to the target base station, and the target base station receives the first data packet sent by the terminal. A packet header of the first data packet carries the first indication information. Further, the packet header is a packet data convergence protocol (PDCP) packet header or an radio link control (RLC) packet header.

Method six: The terminal sends a control PDU to the target base station, and the target base station receives the control PDU sent by the terminal. The control PDU carries the first indication information. Further, the control PDU is a PDCP control PDU or an RLC control PDU.

In the embodiments of the disclosure, the target base station receives an RRC resume request message sent by the terminal. The target base station obtains a first terminal identifier (e.g., I-RNTI) from the RRC resume request message, addresses an anchor base station according to the first terminal identifier, and sends a retrieve terminal context request message to the anchor base station. Herein, if the anchor base station determines to send the context of the terminal to the target base station, the target base station resumes the context of the terminal, and if the anchor base station determines not to send the context of the terminal to the target base station, the anchor base station resumes the context of the terminal. Herein, the RRC resume request message is carried in the MSG3 of the 4-step random access process, or the RRC resume request message is carried in the MSGA of the 2-step random access process.

For instance: 1) After receiving the RRC resume request message, the target base station decodes the message and obtains the identifier of the UE (i.e., I-RNTI). The target base station addresses the anchor base station according to the I-RNTI, and sends a RETRIEVE UE CONTEXT REQUEST message to the anchor base station. 2) The anchor base station determines whether to relocate the UE context, and if it determines to relocate the UE context, the anchor base station replies to the RETRIEVE UE CONTEXT RESPONSE message sent by the target base station and transfers the UE context to the target base station. If it is determined not to relocate the UE context, the anchor base station replies to the target base station with a RETRIEVE UE CONTEXT FAILURE message. 3) If the UE context is relocated, the target base station resumes the UE context (such as resuming security, resuming a data radio bearer (DRB) configuration, resuming an Signaling Radio Bearer (SRB) configuration, etc.) after receiving the UE context sent by the anchor base station. If the UE context is not relocated, the anchor base station resumes the UE context (such as resuming security, resuming the DRB configuration, resuming the SRB configuration, etc.).

In step 402, the target base station sends first configuration information to the terminal, and the terminal receives the first configuration information sent by the target base station. The first configuration information is used by the terminal to determine at least one uplink transmission resource corresponding to at least one of the packet data to be sent.

In the embodiments of the disclosure, implementation of the first configuration information may be achieved by adopting any one of the following methods.

Method I) The target base station sends a static configuration instruction to the terminal, and the terminal receives the static configuration instruction sent by the target base station. The static configuration instruction carries the first configuration information. Further, the static configuration instruction is an RRC message, the RRC message is the MSG4 in the 4-step random access process, or the RRC message is the MSGB in the 2-step random access process.

For method I), the target base station uses a pre-configuration method to configure one or more uplink transmission resources (i.e., uplink grant) for the terminal.

Method II) The target base station sends a dynamic scheduling instruction to the terminal, and the terminal receives the dynamic scheduling instruction sent by the target base station. The dynamic scheduling instruction carries the first configuration information. Further, the dynamic scheduling instruction is downlink control information (DCI).

For method II, the target base station uses a dynamic scheduling method to schedule one or more UL grants for the terminal.

Note that method I) and method II) in step 402 may be implemented in any combination with method one to method six in step 401. For example, in the case where the first indication information is implemented by method one or by method two, the UL grant may be scheduled by adopting method I) or method II). To give another example, in the case where the first indication information is implemented by method three, by method four, by method five, or by method six, the UL grant may be scheduled by adopting method II).

In the embodiments of the disclosure, the uplink transmission resource (i.e., UL grant) refers to a physical uplink shared channel (PUSCH) resource. The target base station may configure a corresponding relationship between a preamble and the PUSCH, and the corresponding relationship may be one preamble corresponding to one or more PUSCHs. In this way, if there are multiple pieces of the packet data to be sent by the terminal, multiple PUSCH resources may be selected to send the packet data.

Note that the terminal in the embodiments of the disclosure is in an inactive state when sending the packet data, that is, the UL grant scheduled by the target base station is used by the terminal in the inactive state to send the packet data. The UL grant and packet data transmission are described as follows in combination with FIG. 5A and FIG. 5B.

Figure 5A:
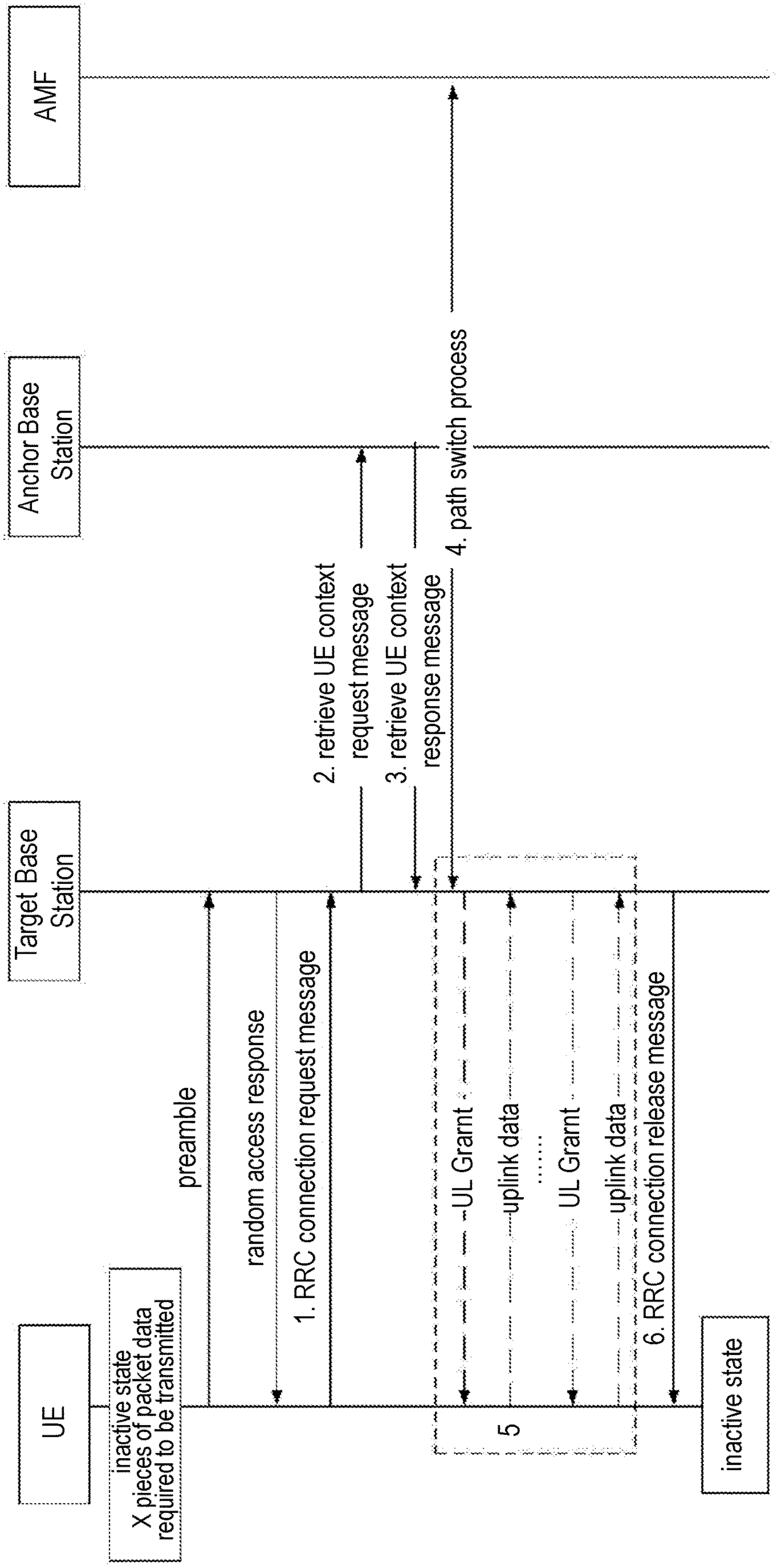
FIG. 5A is a first schematic diagram of uplink data transmission provided by an embodiment of the disclosure.

With reference to FIG. 5A, the following process flow is included. 1. When the UE is in an inactive state, there are X pieces of the packet data to be sent, and an RRC resume request message is sent to the target base station. 2. The target base station sends a retrieve UE context request message to the anchor base station. 3. The anchor base station determines to relocate the UE context and replies to the target base station with a retrieve UE context response message. 4. The target base station resumes the UE context and initiates a path conversion process to the AMF. 5. The target base station sends a UL grant to the UE, and the UE sends uplink data based on the UL grant. Herein, the uplink data refers to packet data. The target base station may send the UL grant to the UE multiple times, so that the UE may continuously send multiple uplink data. 6. The target base station sends an RRC connection release message to the UE.

Figure 5B:
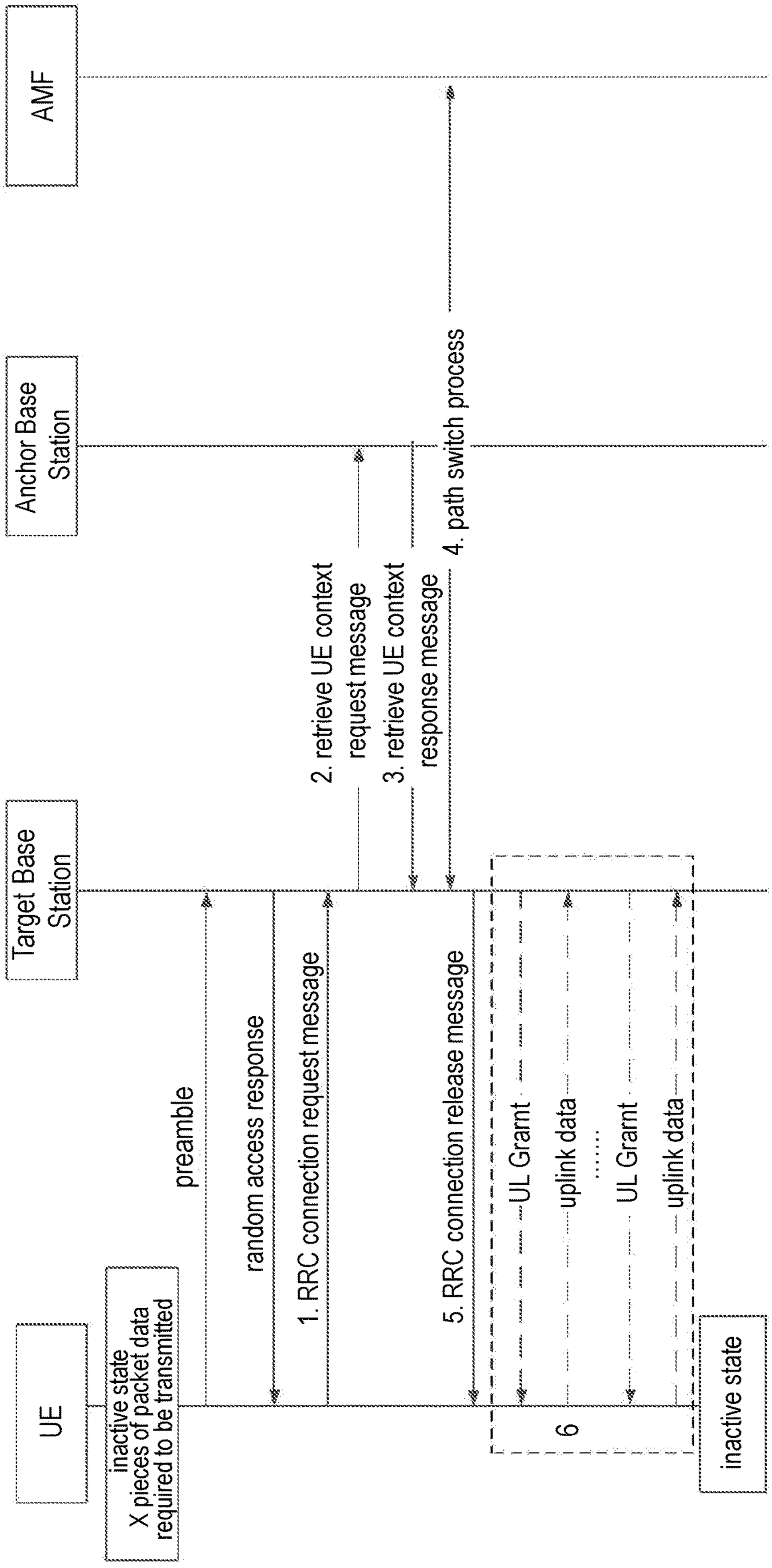
FIG. 5B is a second schematic diagram of uplink data transmission provided by an embodiment of the disclosure.

With reference to FIG. 5B, the following process flow is included. 1. When the UE is in an inactive state, there are X pieces of the packet data to be sent, and an RRC resume request message is sent to the target base station. 2. The target base station sends a retrieve UE context request message to the anchor base station. 3. The anchor base station determines to relocate the UE context and replies to the target base station with a retrieve UE context response message. 4. The target base station resumes the UE context and initiates a path conversion process to the AMF. 5. The target base station sends an RRC connection release message to the UE. 6. The target base station sends a UL grant to the UE, and the UE sends uplink data based on the UL grant. Herein, the uplink data refers to packet data. The target base station may send the UL grant to the UE multiple times, so that the UE may continuously send multiple uplink data.

Note that in the process flows shown in FIG. 5A and FIG. 5B, the target base station dynamically schedules the UL grant to the terminal multiple times. The embodiments of the disclosure are not limited thereto, and the target base station may also schedule multiple UL grants to the terminal at a time, that is, the target base station configures one or more UL grants for the terminal at a time in a pre-configuration manner.

Figure 6:
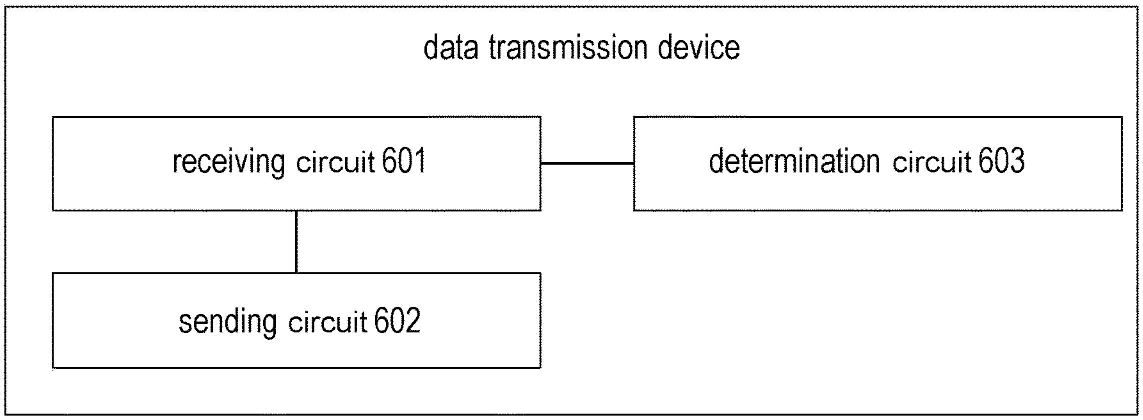
FIG. 6 is a first schematic view of a structure forming a data transmission device provided by an embodiment of the disclosure.

FIG. 6 is a first schematic view of a structure forming a data transmission device provided by an embodiment of the disclosure, and as shown in FIG. 6, the data transmission device includes a receiving unit 601 and a sending unit 602.

The receiving unit 601 is configured to receive first indication information sent by a terminal. The first indication information is configured to indicate a number of the packet data to be sent by the terminal and/or whether the packet data to be sent exists.

The sending unit 602 is configured to send first configuration information to the terminal. The first configuration information is used by the terminal to determine at least one uplink transmission resource corresponding to at least one of the packet data to be sent.

In an embodiment, the receiving unit 601 is configured to receive a first preamble sent by the terminal on a first PRACH resource, and the first PRACH resource and/or the first preamble have/has an association relationship with the number of the packet data to be sent by the terminal.

The device further includes a determination unit 603 configured to determine the number of the packet data to be sent by the terminal according to the first PRACH resource and/or the first preamble.

In an embodiment, the sending unit 602 is configured to send second configuration information to the terminal, and the second configuration information is used by the terminal to determine the association relationship between the number of the packet data to be sent and the first PRACH resource and/or the first preamble.

In an embodiment, the second configuration information is configured through a system broadcasting message or dedicated signaling.

In an embodiment, the receiving unit 601 is configured to receive a first message sent by the terminal, and the first message carries the first indication information.

In an embodiment, the first message is the MSG3 in the 4-step random access process, or the first message is the MSGA in the 2-step random access process.

In an embodiment, the receiving unit 601 is configured to receive uplink data or uplink signaling sent by the terminal, and a MAC SDU corresponding to the uplink data or the uplink signaling is multiplexed with a first MAC CE in a same MAC PDU, and the first MAC CE carries the first indication information.

In an embodiment, the receiving unit 601 is configured to receive uplink data or uplink signaling sent by the terminal, a MAC SDU corresponding to the uplink data or the uplink signaling is multiplexed with a second MAC CE in a same MAC PDU, and the second MAC CE carries a BSR, and The BSR indicates that the packet data to be sent exits and/or the number of the packet data to be sent.

In an embodiment, the receiving unit 601 is configured to receive a first data packet sent by the terminal, and a packet header of the first data packet carries the first indication information.

In an embodiment, the packet header is a PDCP packet header or an RLC packet header.

In an embodiment, the receiving unit 601 is configured to receive a control PDU sent by the terminal, and the control PDU carries the first indication information.

In an embodiment, the control PDU is a PDCP control PDU or an RLC control PDU.

In an embodiment, the sending unit 602 is configured to send a static configuration instruction to the terminal, and the static configuration instruction carries the first configuration information.

In an embodiment, the static configuration instruction is an RRC message, the RRC message is the MSG4 in the 4-step random access process, or the RRC message is the MSGB in the 2-step random access process.

In an embodiment, the sending unit 602 is configured to send a dynamic scheduling instruction to the terminal, and the dynamic scheduling instruction carries the first configuration information.

In an embodiment, the dynamic scheduling instruction is DCI.

In an embodiment, the receiving unit 601 is configured to receive an RRC resume request message sent by the terminal.

The receiving unit 601 is configured to obtain a first terminal identifier from the RRC resume request message, address an anchor base station according to the first terminal identifier, and send a retrieve terminal context request message to the anchor base station.

Herein, if the anchor base station determines to send the context of the terminal to a target base station, the target base station resumes the context of the terminal, and if the anchor base station determines not to send the context of the terminal to the target base station, the anchor base station resumes the context of the terminal.

In an embodiment, the RRC resume request message is carried in the MSG3 of the 4-step random access process, or the RRC resume request message is carried in the MSGA of the 2-step random access process.

A person having ordinary skill in the art should understand that the relevant description of the foregoing data transmission device in the embodiments of the disclosure may be understood with reference to the relevant description of the data transmission method in the embodiments of the disclosure.

Figure 7:
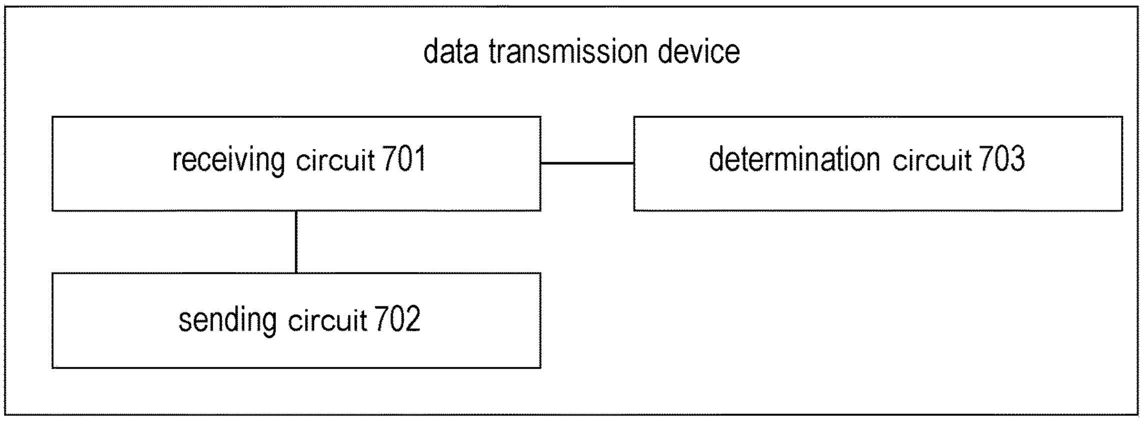
FIG. 7 is a second schematic view of a structure forming a data transmission device provided by an embodiment of the disclosure.

FIG. 7 is a second schematic view of a structure forming a data transmission device provided by an embodiment of the disclosure, and as shown in FIG. 7, the data transmission device includes a receiving unit 701 and a sending unit 702.

The sending unit 701 is configured to send first indication information to a target base station. The first indication information is configured to indicate a number of the packet data to be sent by the terminal and/or whether the packet data to be sent exists.

The receiving unit 602 is configured to receive first configuration information sent by the target base station. The first configuration information is used by the terminal to determine at least one uplink transmission resource corresponding to at least one packet data to be sent.

In an embodiment, the sending unit 701 is configured to send a first preamble to the target base station on a first PRACH resource, and the first PRACH resource and/or the first preamble have/has an association relationship with the number of the packet data to be sent by the terminal.

In an embodiment, the receiving unit 702 is configured to receive second configuration information sent by the target base station, and the second configuration information is used by the terminal to determine the association relationship between the number of the packet data to be sent and the first PRACH resource and/or the first preamble.

The device further includes a determination unit 703 configured to determine the first PRACH resource and/or the first preamble based on the second configuration information and the number of the packet data to be sent.

In an embodiment, the second configuration information is configured through a system broadcasting message or dedicated signaling.

In an embodiment, the sending unit 701 is configured to send a first message to the target base station, and the first message carries the first indication information.

In an embodiment, the first message is the MSG3 in the 4-step random access process, or the first message is the MSGA in the 2-step random access process.

In an embodiment, the sending unit 701 is configured to send uplink data or uplink signaling to the target base station, a MAC SDU corresponding to the uplink data or the uplink signaling is multiplexed with a first MAC CE in a same MAC PDU, and the first MAC CE carries the first indication information.

In an embodiment, the sending unit 701 is configured to send uplink data or uplink signaling to the target base station, a MAC SDU corresponding to the uplink data or the uplink signaling is multiplexed with a second MAC CE in a same MAC PDU, and the second MAC CE carries a BSR, and the BSR indicates that the packet data to be sent exists and/or the number of the packet data to be sent.

In an embodiment, the sending unit 701 is configured to send a first data packet to the target base station, and a packet header of the first data packet carries the first indication information.

In an embodiment, the packet header is a PDCP packet header or an RLC packet header.

In an embodiment, the sending unit 701 is configured to send a control PDU to the target base station, and the control PDU carries the first indication information.

In an embodiment, the control PDU is a PDCP control PDU or an RLC control PDU.

In an embodiment, the receiving unit 702 is configured to receive a static configuration instruction sent by the target base station, and the static configuration instruction carries the first configuration information.

In an embodiment, the static configuration instruction is an RRC message, the RRC message is the MSG4 in the 4-step random access process, or the RRC message is the MSGB in the 2-step random access process.

In an embodiment, the receiving unit 702 is configured to receive a dynamic scheduling instruction sent by the target base station, and the dynamic scheduling instruction carries the first configuration information.

In an embodiment, the dynamic scheduling instruction is DCI.

A person having ordinary skill in the art should understand that the relevant description of the foregoing data transmission device in the embodiments of the disclosure may be understood with reference to the relevant description of the data transmission method in the embodiments of the disclosure.

Figure 8:
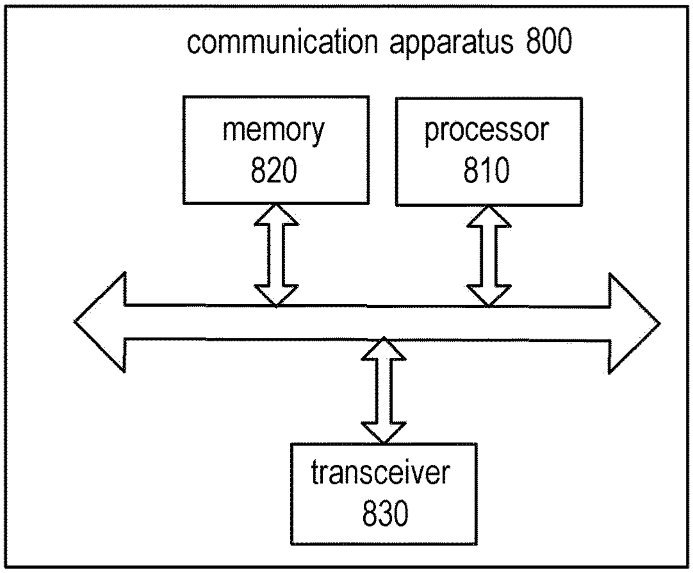
FIG. 8 is a schematic view of a structure of a communication apparatus provided by an embodiment of the disclosure.

FIG. 8 is a schematic view of a structure of a communication apparatus 800 provided by an embodiment of the disclosure. The communication apparatus may be a terminal or a network apparatus (e.g., a base station). The communication apparatus 800 shown in FIG. 8 includes a processor 810, and the processor 810 may call and run a computer program from a memory to implement the method in the embodiments of the disclosure.

Optionally, as shown in FIG. 8, the communication apparatus 800 may further include a memory 820. The processor 810 may call and run a computer program from the memory 820 to implement the method in the embodiments of the disclosure.

The memory 820 may be a separate device independent of the processor 810 or may be integrated in the processor 810.

Optionally, as shown in FIG. 8, the communication apparatus 800 may further include a transceiver 830, and the processor 810 may control the transceiver 830 to communicate with other apparatuses. Specifically, it can send information or data to other apparatuses, or receive information or data sent by other apparatuses.

The transceiver 830 may include a transmitter and a receiver. The transceiver 830 may further include an antenna, and a number of antennas may be one or more.

Optionally, the communication apparatus 800 may specifically be a network apparatus in the embodiments of the disclosure, and the communication apparatus 800 may implement the corresponding process flows implemented by the network apparatus in the various methods in the embodiments of the disclosure. For the sake of brevity, description thereof is not repeated herein.

Optionally, the communication apparatus 800 may specifically be a mobile terminal/terminal in the embodiments of the disclosure, and the communication apparatus 800 may implement the corresponding process flows implemented by the mobile terminal/terminal in the various methods in the embodiments of the disclosure. For the sake of brevity, description thereof is not repeated herein.

Figure 9:
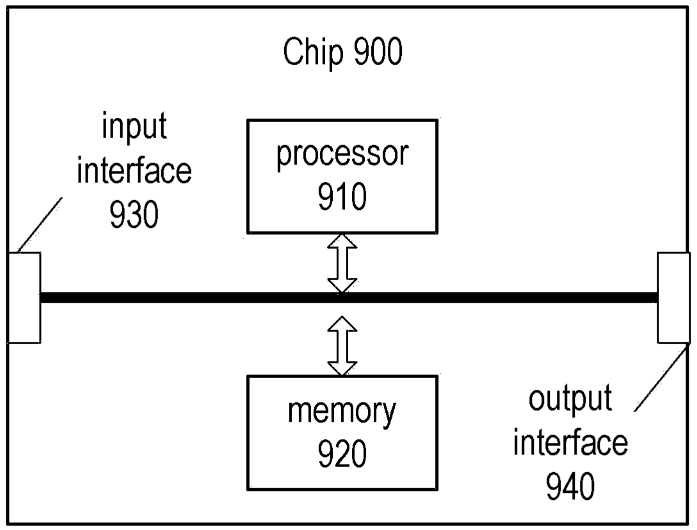
FIG. 9 is a schematic view of a structure of a chip provided by an embodiment of the disclosure.

FIG. 9 is a schematic view of a structure of a chip provided by an embodiment of the disclosure. A chip 900 shown in FIG. 9 includes a processor 910, and the processor 910 may call and run a computer program from a memory to implement the method in the embodiments of the disclosure.

Optionally, as shown in FIG. 9, the chip 900 may further include a memory 920. The processor 910 may call and run a computer program from the memory 920 to implement the method in the embodiments of the disclosure.

The memory 920 may be a separate device independent of the processor 910 or may be integrated in the processor 910.

Optionally, the chip 900 may further include an input interface 930. The processor 910 may control the input interface 930 to communicate with other apparatuses or chips, and specifically, may obtain information or data sent by other apparatuses or chips.

Optionally, the chip 900 may further include an output interface 940. The processor 910 may control the output interface 940 to communicate with other apparatuses or chips, and specifically, may output information or data to other apparatuses or chips.

Optionally, the chip may be applied to the network apparatus in the embodiments of the disclosure, and the chip may implement the corresponding process flows implemented by the network apparatus in the various methods in the embodiments of the disclosure. For the sake of brevity, description thereof is not repeated herein.

Optionally, the chip may be applied to the mobile terminal/terminal in the embodiments of the disclosure, and the chip may implement the corresponding process flows implemented by the mobile terminal/terminal in the various methods in the embodiments of the disclosure. For the sake of brevity, description thereof is not repeated herein.

It should be understood that the chip mentioned in the embodiments of the disclosure may also be referred to as a system-level chip or a system on a chip.

Figure 10:
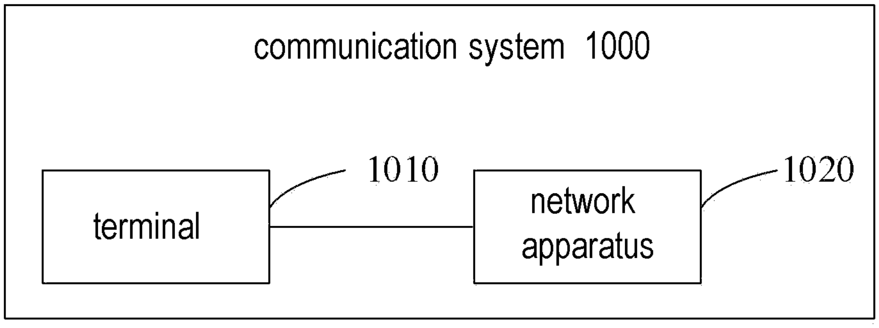
FIG. 10 is a schematic block view of a communication system provided by an embodiment of the disclosure.

FIG. 10 is a schematic block view of a communication system 1000 provided by an embodiment of the disclosure. As shown in FIG. 10, the communication system 1000 includes a terminal 1010 and a network apparatus 1020.

The terminal 1010 may be used to implement the corresponding functions implemented by the terminal in the foregoing method, and the network apparatus 1020 may be used to implement the corresponding functions implemented by the network apparatus in the foregoing method. For the sake of brevity, description thereof is not repeated herein.

It should be understood that the processor of the embodiments of the disclosure may be an integrated circuit chip with signal processing capability. In the implementation process, the steps of the foregoing method in the embodiments may be completed by an integrated logic circuit of hardware or an instruction in the form of software in the processor. The processor may be a general-purpose processor, a digital signal processor (DSP), an application specific integrated circuit (ASIC), a field programmable gate array (FPGA), or other components such as a programmable logic device, a discrete gate, a transistor logic device, and a discrete hardware component. The processor may implement or execute various methods, steps, and logical block diagrams disclosed in the embodiments of the disclosure. The general-purpose processor may be a microprocessor, or the processor may be any conventional processor and the like. The steps of the method disclosed in the embodiments of the disclosure may be directly implemented as being executed and completed by a hardware decoding processor, or may be executed and completed by a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads the information in the memory and completes the steps of the foregoing method in combination with its hardware.

It may be understood that the memory in the embodiments of the disclosure may be a volatile memory or a non-volatile memory or may include both the volatile memory and the non-volatile memory. The non-volatile memory may be a ready-only memory (ROM), a programmable ROM (PROM), an erasable PROM (EPROM), an electrically EPROM (EEPROM), or a flash memory. The volatile memory may be a random access memory (RAM) used as an external cache. By way of exemplary but not restrictive description, many forms of the RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DRRAM). It should be noted that the memory of the system and the method described herein is intended to include, but not limited to, these and any other suitable types of memories.

It should be understood that the above-mentioned memory is exemplary but not restrictive. For instance, the memory in the embodiments of the disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct rambus RAM (DRRAM) and the like. That is, the memory in the embodiments of the disclosure is intended to include, but not limited to, these and any other suitable types of memory.

The embodiments of the disclosure further provides a computer-readable storage medium configured for storing a computer program.

Optionally, the computer-readable storage medium may be applied to the network apparatus in the embodiments of the disclosure, and the computer program causes a computer to execute the corresponding process flows implemented by the network apparatus in the various methods of the embodiments of the disclosure. For the sake of brevity, description thereof is not repeated herein.

Optionally, the computer-readable storage medium may be applied to the mobile terminal/terminal in the embodiments of the disclosure, and the computer program causes a computer to execute the corresponding process flows implemented by the mobile terminal/terminal in the various methods of the embodiments of the disclosure. For the sake of brevity, description thereof is not repeated herein.

The embodiments of the disclosure further provides a computer program product including a computer program instruction.

Optionally, the computer program product may be applied to the network apparatus in the embodiments of the disclosure, and the computer program instruction causes the computer to execute the corresponding process flows implemented by the network apparatus in the various methods of the embodiments of the disclosure. For the sake of brevity, description thereof is not repeated herein.

Optionally, the computer program product may be applied to the mobile terminal/terminal in the embodiments of the disclosure, and the computer program instruction causes a computer to execute the corresponding process flows implemented by the mobile terminal/terminal in the various methods of the embodiments of the disclosure. For the sake of brevity, description thereof is not repeated herein.

The embodiments of the disclosure further provides a computer program.

Optionally, the computer program may be applied to the network apparatus in the embodiments of the disclosure, and when running on a computer, the computer program causes the computer to execute the corresponding process flows implemented by the network apparatus in the various methods of the embodiments of the disclosure. For the sake of brevity, description thereof is not repeated herein.

Optionally, the computer program may be applied to the mobile terminal/terminal in the embodiments of the disclosure, and when running on a computer, the computer program causes the computer to execute the corresponding process flows implemented by the mobile terminal/terminal in the various methods of the embodiments of the disclosure. For the sake of brevity, description thereof is not repeated herein.

A person having ordinary skill in the art may be aware that in combination with the disclosed embodiments, the described exemplary units and algorithm steps may be implemented by electronic hardware or a combination of computer software and electronic hardware. Whether these functions are executed by hardware or software depends on the specific application and design constraint conditions of the technical solution. Professionals and technicians can use different methods for each specific application to implement the described functions, but such implementation should not be considered beyond the scope of the disclosure.

A person having ordinary skill in the art may clearly understand that, for the convenience and brevity of description, the specific working process of the abovementioned system, device, and unit may refer to the corresponding processes in the foregoing method embodiments, which is not repeated herein.

In the several embodiments provided in the disclosure, it should be understood that the disclosed system, device, and method may be implemented in other ways. For instance, the device embodiments described above are only illustrative. For instance, the division of the unit is only a logical function division, and there may be other division methods in actual implementation. For instance, multiple units or components may be combined or integrated into another system, or some features may be omitted or may not be implemented. In addition, the displayed or discussed mutual coupling or direct coupling or communication connection may be implemented through some interfaces, and the indirect coupling or communication connection of the device or unit may be in electrical, mechanical, or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, in the embodiments of the disclosure, each functional unit may be integrated into one processing unit, or each unit may exist alone physically, or two or more units may be integrated into one unit.

If the function is implemented in the form of a software functional unit and sold or used as an independent product, it may be stored in a computer-readable storage medium. Based on this understanding, regarding the technical solution of the disclosure, the part that contributes to the related art or the part of the technical solution, may be embodied in the form of a software product in essence. The computer software product is stored in a storage medium and includes a number of instructions to enable a computer apparatus (which may be a personal computer, a server, or a network apparatus and the like) to execute all or part of the steps of the method described in the various embodiments of the disclosure. The aforementioned storage medium includes a U disk, a mobile hard disk, a read-only memory (ROM), a random access memory (RAM), a magnetic disk, an optical disk, or other media that may store program codes.

The above are only specific implementations of the disclosure, but the protection scope of the disclosure is not limited thereto. A person having ordinary skill in the art may easily think of changes or substitutions within the technical scope disclosed in the disclosure, and these changes or substitutions should be covered by the protection scope of the disclosure. Therefore, the protection scope of the disclosure shall be subject to the protection scope of the claims.

What is claimed is:

1. A base station, wherein the base station is a target base station comprising a processor and a memory, wherein the memory stores a program, the processor is configured to execute the program to cause the base station to perform steps of:

receiving first indication information sent by a terminal, wherein the first indication information is configured to indicate whether the small data to be sent exists;

sending multiple dynamic scheduling instructions to the terminal respectively in multiple times, wherein the multiple dynamic scheduling instructions are sent to the same terminal, wherein the dynamic scheduling instructions carries first configuration information, the first configuration information is used by the terminal to determine uplink transmission resources corresponding to small data to be sent, wherein the multiple dynamic scheduling instructions are downlink control information (DCI);

consecutively receiving multiple small data transmitted by the terminal based on the multiple dynamic scheduling instructions while the terminal remains in an RRC-INACTIVE state; and sending to the terminal, an RRC connection release message;

the processor is configured to execute the program to cause the base station to perform a step of:

receiving a first data packet sent by the terminal, wherein a packet header of the first data packet carries the first indication information, wherein the packet header is a packet data convergence protocol (PDCP) packet header or a radio link control (RLC) packet header; and receiving a control PDU sent by the terminal, wherein the control PDU carries the first indication information, wherein the control PDU is a PDCP control PDU or an RLC control PDU.

2. The base station according to claim 1, wherein the processor is configured to execute the program to cause the base station to perform a step of:

receiving a first message sent by the terminal, wherein the first message carries the first indication information;

wherein the first message is MSG3 in a 4-step random access process, or the first message is MSGA in a 2-step random access process.

3. The base station according to claim 1, wherein the processor is configured to execute the program to cause the base station to perform a step of:

receiving uplink data or uplink signaling sent by the terminal, wherein a medium access control (MAC) service data unit (SDU) corresponding to the uplink data or the uplink signaling is multiplexed with a first MAC control element (CE) in a same MAC protocol data unit (PDU), and the first MAC CE carries the first indication information.

4. The base station according to claim 1, wherein the processor is configured to execute the program to cause the base station to perform a step of:

receiving uplink data or uplink signaling sent by the terminal, wherein a MAC SDU corresponding to the uplink data or the uplink signaling is multiplexed with a second MAC CE in a same MAC PDU, the second MAC CE carries a buffer status report (BSR), and the BSR indicates that the packet data to be sent exists.

5. The base station according to claim 1, wherein the processor is configured to execute the program to cause the base station to perform steps of:

receiving an RRC resume request message sent by the terminal; and obtaining a first terminal identifier from the RRC resume request message, addressing an anchor base station according to the first terminal identifier, and sending, by the target base station, a retrieve terminal context request message to the anchor base station, wherein if the anchor base station determines to send the context of the terminal to the target base station, the target base station resumes the context of the terminal.

6. A small data transmission method, comprising:

sending, by a terminal, first indication information to a target base station, wherein the first indication information is configured to indicate whether the small data to be sent exists;

receiving, by the terminal, multiple dynamic scheduling instructions transmitted by the target base station respectively in multiple times, wherein the multiple dynamic scheduling instructions are sent to the same terminal, wherein the dynamic scheduling instructions carries first configuration information, the first configuration information is used by the terminal to determine uplink transmission resources corresponding to small data to be sent, wherein the multiple dynamic scheduling instructions are downlink control information (DCI);

consecutively sending, by the terminal to the target base station, multiple small data based on the multiple dynamic scheduling instructions while remaining in an RRC-INACTIVE sate; and receiving, by the terminal, an RRC connection release message sent by the target base station;

wherein the step of sending, by the terminal, the first indication information to the target base station comprises:

sending a first data packet to the target base station, wherein a packet header of the first data packet carries the first indication information, wherein the packet header is a packet data convergence protocol (PDCP) packet header or a radio link control (RLC) packet header; and sending a control PDU to the target base station, wherein the control PDU carries the first indication information, wherein the control PDU is a PDCP control PDU or an RLC control PDU.

7. The method according to claim 6, wherein the step of sending the first indication information to the target base station by the terminal comprises:

sending, by the terminal, a first message to the target base station, wherein the first message carries the first indication information;

wherein the first message is MSG3 in a 4-step random access process, or the first message is MSGA in a 2-step random access process.

8. The method according to claim 6, wherein the step of sending, by the terminal, the first indication information to the target base station comprises:

sending, by the terminal, uplink data or uplink signaling to the target base station, wherein a medium access control (MAC) service data unit (SDU) corresponding to the uplink data or the uplink signaling is multiplexed with a first MAC control element (CE) in a same MAC protocol data unit (PDU), and the first MAC CE carries the first indication information.

9. The method according to claim 6, wherein the step of sending, by the terminal, the first indication information to the target base station comprises:

sending, by the terminal, uplink data or uplink signaling to the target base station, wherein a MAC SDU corresponding to the uplink data or the uplink signaling is multiplexed with a second MAC CE in a same MAC PDU, the second MAC CE carries a buffer status report (BSR), and the BSR indicates that the packet data to be sent exists.

10. The base station according to claim 5, wherein the RRC resume request message is carried in MSG3 in a 4-step random access process, or the RRC resume request message is carried in the MSGA in a 2-step random access process.

11. The base station according to claim 5, wherein if the anchor base station determines not to send the context of the terminal to the target base station, the anchor base station resumes the context of the terminal.

12. A terminal device, comprising a processor and a memory, wherein the memory stores a program, the processor is configured to execute the program to cause the terminal device to perform operations of:

sending first indication information to a target base station, wherein the first indication information is configured to indicate whether the small data to be sent exists;

receiving multiple dynamic scheduling instructions transmitted by the target base station respectively in multiple times, wherein the multiple dynamic scheduling instructions are sent to the same terminal, wherein the dynamic scheduling instructions carries first configuration information, the first configuration information is used by the terminal to determine uplink transmission resources corresponding to small data to be sent, wherein the multiple dynamic scheduling instructions are downlink control information (DCI);

consecutively sending, to the target base station, multiple small data based on the multiple dynamic scheduling instructions while remaining in an RRC-INACTIVE sate; and receiving an RRC connection release message sent by the target base station;

wherein the processor is configured to invoke and run the program to cause the terminal device to perform an operation of:

sending a first data packet to the target base station, wherein a packet header of the first data packet carries the first indication information, wherein the packet header is a packet data convergence protocol (PDCP) packet header or a radio link control (RLC) packet header; and sending a control PDU to the target base station, wherein the control PDU carries the first indication information, wherein the control PDU is a PDCP control PDU or an RLC control PDU.

13. The terminal device according to claim 12, wherein the processor is configured to invoke and run the program to cause the terminal device to perform an operation of:

sending a first message to the target base station, wherein the first message carries the first indication information;

wherein the first message is MSG3 in a 4-step random access process, or the first message is MSGA in a 2-step random access process.

14. The terminal device according to claim 12, wherein the processor is configured to invoke and run the program to cause the terminal device to perform an operation of:

sending uplink data or uplink signaling to the target base station, wherein a medium access control (MAC) service data unit (SDU) corresponding to the uplink data or the uplink signaling is multiplexed with a first MAC control element (CE) in a same MAC protocol data unit (PDU), and the first MAC CE carries the first indication information.

15. The terminal device according to claim 12, wherein the processor is configured to invoke and run the program to cause the terminal device to perform an operation of:

sending uplink data or uplink signaling to the target base station, wherein a MAC SDU corresponding to the uplink data or the uplink signaling is multiplexed with a second MAC CE in a same MAC PDU, the second MAC CE carries a buffer status report (BSR), and the BSR indicates that the packet data to be sent exists.

* * * * *